(12) United States Patent
Shim et al.

(10) Patent No.: US 8,940,805 B2
(45) Date of Patent: Jan. 27, 2015

(54) ANTI-GLARE COATING COMPOSITION HAVING IMPROVED ANTI-FINGERPRINT FUNCTION AND ANTI-GLARE FILM PREPARED THEREFROM

(71) Applicant: LG Chem, Ltd., Seoul (KR)

(72) Inventors: Jae-Hoon Shim, Daejeon (KR); Seung-Jung Lee, Daejeon (KR); Yeong Rae Chang, Daejeon (KR); Jae-Pil Koo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/155,024

(22) Filed: Jan. 14, 2014

(65) Prior Publication Data

US 2014/0133033 A1    May 15, 2014

Related U.S. Application Data

(63) Continuation of application No. PCT/KR2012/005735, filed on Jul. 18, 2012.

(30) Foreign Application Priority Data

Jul. 18, 2011 (KR) .......................... 10-2011-0071057

(51) Int. Cl.
```
C08F 2/50      (2006.01)
C09D 7/12      (2006.01)
C09D 4/00      (2006.01)
G02B 1/11      (2006.01)
C09D 5/00      (2006.01)
G02B 27/00     (2006.01)
```

(52) U.S. Cl.
CPC ............. *C09D 7/1233* (2013.01); *C09D 4/00* (2013.01); *G02B 1/111* (2013.01); *C09D 5/006* (2013.01); *G02B 27/0006* (2013.01)
USPC .............................................. 522/33; 524/376

(58) Field of Classification Search
CPC ............ C08J 7/042; C08J 7/047; G02B 1/11; G02B 1/111
USPC .............................................. 522/33; 524/376
See application file for complete search history.

(56) References Cited

U.S. PATENT DOCUMENTS

2008/0057262 A1 *  3/2008  Ooishi et al. ............... 428/98

FOREIGN PATENT DOCUMENTS

| | | |
|---|---|---|
| JP | 2004163610 A | 6/2004 |
| JP | 2004191916 A | 7/2004 |
| JP | 2005284142 A | 10/2005 |
| KR | 10-0681493 B1 | 2/2007 |
| KR | 2007-0015163 A | 2/2007 |
| KR | 2007-0120534 A | 12/2007 |
| KR | 2008-0044021 A | 5/2008 |

* cited by examiner

*Primary Examiner* — Edward Cain
(74) *Attorney, Agent, or Firm* — McKenna Long & Aldridge, LLP

(57) ABSTRACT

The present invention relates to an anti-glare coating composition for preparation of anti-glare films having good anti-fingerprint properties as well as improved contrast ratio and image definition. More specifically, the coating composition comprises organic or inorganic particles, a photocurable resin, a photoinitiator, and a compound including an olefin oxide repeating unit.

12 Claims, No Drawings

ANTI-GLARE COATING COMPOSITION HAVING IMPROVED ANTI-FINGERPRINT FUNCTION AND ANTI-GLARE FILM PREPARED THEREFROM

This application is a Continuation Bypass Application of International Patent Application No. PCT/KR2012/005735, filed on Jul. 18, 2012, which claims priority to and the benefit of Korean Patent Application No. 10-2011-0071057, filed on Jul. 18, 2011, in the Korean Intellectual Property Office, all of which are hereby incorporated by reference.

FIELD OF THE INVENTION

The present invention relates to an anti-glare coating composition with an improved anti-fingerprint function and an anti-glare film prepared from the same.

BACKGROUND OF THE INVENTION

Flat panel displays (FPDs), including LCD, PDP, OLED, rear-projection TV, etc., have a reflection of light on the surface of the monitor upon exposed to an incident light such as natural light, causing eye fatigue or headache and blurry vision at the image created in the displays. A solution to this problem is using an anti-glare film applied to the surface of displays.

On the other hand, there is a trend for the anti-glare film to have the lower haze value for the purpose of having a high contrast ratio. When it comes to fingerprint marks, the anti-glare film with a low haze value is likely to have them more noticeable and offer poor visibility of the image.

Thus, there has been considerable attention drawn to the studies on the anti-glare film having an anti-fingerprint function with low haze value for the sake of providing high contrast ratio.

In an attempt to find a solution to the above-specified problem with the prior art, the inventors of the present invention have made sustained studies on the anti-glare film having an anti-fingerprint function as well as high contrast ratio and high image visibility to complete the present invention.

DETAILED DESCRIPTION OF THE INVENTION
TECHNICAL OBJECTIVES

It is an object of the present invention to provide an anti-glare coating composition for preparing an anti-glare film with good anti-fingerprint properties as well as high contrast ratio and high image definition.

It is another object of the present invention to provide an anti-glare film prepared from the anti-glare coating composition and a display device comprising the anti-glare film.
Technical Solutions The present invention provides an anti-glare composition comprising organic or inorganic particles, a photocurable resin, a photoinitiator, and an olefin oxide compound represented by the following formula 1 or 2:

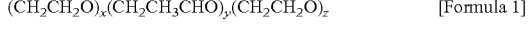  [Formula 1]

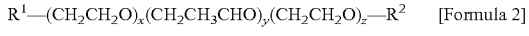  [Formula 2]

In the formula 1 or 2, each of $R^1$ and $R^2$ is independently (meth)acrylate, alkyl(meth)acrylate having 1 to 3 carbon atoms, hydroxide, or hydrogen; and each of x, y and z is independently an integer from 0 to 150 and satisfies $x+y+z \geq 1$.

The present invention also provides an anti-glare film comprising a transparent substrate layer; and an anti-glare layer overlying the transparent substrate layer and being formed from the coating composition.

Throughout this specification, unless otherwise specified, the term "(meth)acrylate" as used herein refers to "acrylate" or "methacrylate"; and the term "alkyl(meth)acrylate" as used herein refers to "alkylacrylate" or "alkylmethacrylate".

Hereinafter, a detailed description will be given as to an anti-glare coating composition and an anti-glare film prepared from the anti-glare coating composition.

The inventors of the present invention have made sustained studies on the anti-glare film having good anti-fingerprint properties to offer improved image visibility even with low haze value, thereby completing the present invention.

Generally, fingerprints contain both hydrophilic substances and lipophilic substances such as sebum, sweat, or the like as secreted from the body. Accordingly, for making fingerprints less noticeable on the surface of displays such as LCD, the coated surface is needed to appropriately contain both lipophilic and hydrophilic components. In other words, the surface of the anti-glare film has to be improved in the wetting property so that the fingerprints having both lipophilic and hydrophilic components spread well on the surface and become less noticeable.

The inventors of the present invention have found out that an anti-glare film prepared from a coating composition including a compound having an olefin oxide repeating unit can have good anti-fingerprint properties as well as defined values of haze, light transmission, image definition and contrast ratio as required for general anti-glare films, thereby completing the present invention.

In accordance with one exemplary embodiment of the present invention, there is provided an anti-glare composition comprising organic or inorganic particles, a photocurable resin, a photoinitiator, and an olefin oxide compound represented by the following formula 1 or 2:

  [Formula 1]

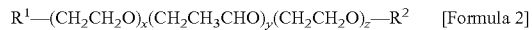  [Formula 2]

where each of $R^1$ and $R^2$ is independently (meth)acrylate, alkyl(meth)acrylate having 1 to 3 carbon atoms, hydroxide, or hydrogen; and each of x, y and z is independently an integer from 0 to 150 and satisfies $x+y+z \geq 1$.

As mentioned above, the inventors of the present invention have completed the present invention on the basis of the finding that an anti-glare film can offer good anti-fingerprint properties as well as equivalent or improved properties of light transmission, haze value, image definition, and contrast ratio, in comparison with those of the conventional anti-glare films, when it is prepared from an anti-glare coating composition using, as an additive, a compound having propylene oxide and/or ethylene oxide repeating units.

In this regard, the compound of the formula 1 or 2 as included in the anti-glare coating composition according to the embodiment of the present invention may be used in the coating composition without limitation in its composition as long as it comprises at least one propylene oxide and/or ethylene oxide repeating unit. When used as an additive to an anti-glare film or the like, the olefin oxide compound represented by the formula 1 or 2 appropriately imposes lipophilic and hydrophilic properties on the surface of the film to make fingerprint marks spread out on the surface of the film and less affect the image visibility on the surface of the display device or the like.

Such an olefin oxide compound may be selected without any limitation in its composition as long as it is represented by the formula 1 or 2. Preferably, in the compound represented by the formula 1, the number of the ethylene oxide repeating units, denoted by "x" or "z", is independently an integer from 1 to 20; and the number of the propylene oxide repeating units, denoted by "y" is an integer from 20 to 100.

Particularly, the inventors of the present invention have found out that that a block copolymer can offer a good fingerprint function when it includes 1 to 20 propylene oxide repeating units and 20 to 100 olefin oxide repeating units, where the relatively hydrophilic ethylene oxide repeating units are at both terminal regions of the propylene oxide repeating units, and the relatively lipophilic propylene oxide repeating units take the center of the compound. More preferably, in the formula 1, each of x and z which denotes the number of olefin oxide repeating units is independently an integer of 1 to 10; and y which denotes the number of propylene oxide repeating units is an integer of 30 to 80.

The weight average molecular weight of the olefin oxide compound represented by the formula 1 may be in the range of 40 to 22,000, preferably 100 to 15,000, more preferably 1,000 to 8,000.

The olefin oxide compound added to enhance the anti-fingerprint function of the anti-glare film may be a compound represented by the formula 2, where propylene oxide and/or ethylene oxide repeating units are located at the center of the block, and (meth)acrylate groups, alkyl(meth)acrylate groups having 1 to 3 carbon atoms, hydroxide groups, or hydrogen atoms are at both terminal regions of the block.

It is also found out that the olefin oxide compound of the formula 2 having (meth)acrylate groups, alkyl(meth)acrylate groups having 1 to 3 carbon atoms, hydroxide groups, or hydrogen atoms at both terminal regions can offer good anti-fingerprint properties even though the olefin oxide repeating units at the center of the compound have a low number average molecular weight. The compound of the formula 2 is not specifically limited in the molecular weight. For optimizing the properties of the anti-glare film including the anti-fingerprint function, the weight average molecular weight of the compound represented by the formula 2 may be in the range of 50 to 10,000, preferably 100 to 5,000, more preferably 200 to 1,000.

In the coating composition according to the embodiment, the organic or inorganic particles are not specifically limited in their composition as long as they are available for general anti-glare coating compositions. Preferably, the organic or inorganic particles may have a particle diameter of 1 to 10 μm with a view to optimizing the light scattering effect when used to form an anti-glare film. Also, the organic or inorganic particles may have a volume average particle diameter of 2 to 10 μm for optimizing the anti-glare effect (i.e., scattering effect).

The organic or inorganic particles may not be limited in their composition as long as they are commonly used to form an anti-glare film. More specifically, the organic or inorganic particles may include at least one selected from the organic particle group consisting of acryl-based resin, styrene-based resin, epoxy resin, and nylon resin; and the inorganic particle group consisting of silicon oxide, titanium dioxide, indium oxide, tin oxide, zirconium oxide, and zinc oxide.

More specifically, the organic particles may include at least one selected from the group consisting of methyl(meth)acrylate, ethyl(meth)acrylate, propyl(meth)acrylate, n-butyl (meth)acrylate, isobutyl(meth)acrylate, t-butyl(meth)acrylate, 2-ethylhexyl(meth)acrylate, n-octyl(meth)acrylate, lauryl(meth)acrylate, stearyl(meth)acrylate, 2-hydroxyethyl (meth)acrylate, polyethylene glycol(meth)acrylate, methoxy polyethylene glycol(meth)acrylate, glycidyl(meth)acrylate, dimethylaminoethyl(meth)acrylate, diethylaminoethyl (meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrene sulfonic acid, p-t-butoxystyrene, m-t-butoxystyrene, vinyl acetate, vinyl propionate, vinyl butyrate, vinyl ether, allyl butyl ether, allyl glycidyl ether, (meth)acrylic acid, maleic acid, unsaturated carboxylic acid, alkyl(meth)acrylamide, (meth)acrylonitrile, and (meth)acrylate.

For preventing the light glaring effect on the user, the organic or inorganic particles used as an ingredient to induce the light scattering effect may be added in an amount of, preferably 1 to 20 parts by weight, more preferably 5 to 15 parts by weight, most preferably 6 to 10 parts by weight, with respect to 100 parts by weight of the photocurable resin.

The content of the organic or inorganic particles less than 1 part by weight with respect to 100 parts by weight of the photocurable resin leads to failure to realize a sufficiently high haze value affected by the internal scattering, while the content of the organic or inorganic particles greater than 20 parts by weight ends up increasing the viscosity of the coating composition to result in poor coatability and realizing an excessively high haze value affected by the internal scattering to deteriorate the contrast ratio.

In the anti-glare coating composition according to the embodiment of the present invention, the photocurable resin may also not be limited in its composition as long as it can be used for general anti-glare films. To be used in the preparation of anti-glare films, the photocurable resin preferably has the difference of refraction index from the organic or inorganic particles in the range of 0.005 to 0.1.

The difference in refraction index between the particles and the photocurable resin less than 0.005 leads to difficulty of acquiring an appropriate haze value required to the anti-glare film, while the difference in refraction index between the particles and the photocurable resin greater than 0.1 makes the internal haze value too high to achieve improved contrast ratio.

Accordingly, the photocurable resin may be used without specific limitation in the type as long as it has the difference in refraction index from the particles in the above-defined range. More specifically, the photocurable resin may include acryl-based resins, such as, for example, reactive acrylate oligomers, multifunctional acrylate monomers, or mixtures thereof Specific examples of the reactive acrylate oligomers may include urethane acrylate oligomer, epoxy acrylate oligomer, polyester acrylate, polyether acrylate, or mixtures thereof.

Specific examples of the multifunctional acrylate monomers may include dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycero triacrylate, tripropylene glycol diacrylate, ethylene glycol diacrylate, or mixtures thereof.

On the other hand, the olefin oxide compound represented by the formula 1 or 2 may be added in an appropriate amount to the coating composition in consideration of the viscosity of the coating composition, the weight-based content of the organic or inorganic particles, and so forth. For optimizing the anti-fingerprint function, the dispersibility of the olefin oxide compound in the coating composition, and the contrast ratio and the haze value of the final anti-glare film, the added amount of the olefin oxide compound is preferably 1 to 50 parts by weight, more preferably 5 to 40 parts by weight, most preferably 10 to 35 parts by weight, with respect to 100 parts by weight of the photocurable resin.

The coating composition according to the embodiment may further include an organic solvent. The organic solvent is not specifically limited in its composition. With a view to providing an appropriate viscosity to the coating composition and enhancing the strength of the final film, the added amount of the organic solvent is, with respect to 100 parts by weight of the photocurable resin, preferably 50 to 500 parts by weight, more preferably 100 to 400 parts by weight, most preferably 150 to 350 parts by weight.

The organic solvent as used herein is not specifically limited in its composition. Specific examples of the organic solvent may include at least one selected from the group consisting of lower alcohols having 1 to 6 carbon atoms, acetates, ketones, cellosolves, dimethyl formamide, tetrahydrofuran, propylene glycol monomethylether, toluene, and xylene. These organic solvents may be used alone or in mixture of at least two.

Specific examples of the lower alcohols may include, but are not limited to, methanol, ethanol, isopropylalcohol, butylalcohol, isobutylalcohol, or diacetone alcohol. Specific examples of the acetates may include, but are not limited to, methylacetate, ethylacetate, isopropylacetate, butylacetate, or cellosolve acetate. Specific examples of the ketones may include, but are not limited to, methylethylketone, methylisobutylketone, acetylacetone, or acetone.

The anti-glare coating composition may further include a photoinitiator for the purpose of curing upon exposure to UV radiation. The added amount of the photoinitiator may be 0.1 to 10 parts by weight with respect to 100 parts by weight of the photocurable resin. The content of the photoinitiator less than 0.1 part by weight with respect to 100 parts by weight of the photocurable resin ends up failing to cause sufficient curing under UV radiation, while the content of the photoinitiator greater than 10 parts by weight with respect to 100 parts by weight of the photocurable resin leads to deterioration in the strength of the final anti-glare film.

The photoinitiator as used herein is not specifically limited in its composition as long as it is usually available for forming an anti-glare film. Specific examples of the photoinitiator may include, but are not limited to, at least one selected from the group consisting of 1-hydroxy cyclohexylphenyl ketone, benzyl dimethyl ketal, hydroxydimethyl acetophenone, benzoin, benzoin methyl ether, benzoin ethyl ether, benzoin isopropyl ether, and benzoin butyl ether. These photoinitiators may be used alone or in mixture of at least two.

The anti-glare coating composition may further include at least one additive selected from the group consisting of a levelling agent, a wetting agent, an antifoaming agent, and silica having a volume average particle diameter of 1 to 50 nm. The added amount of the additive may be in the range of 0.01 to 10 parts by weight with respect to 100 parts by weight of the photocurable resin.

The levelling agent is to level the surface of the coating layer prepared from the anti-glare coating composition. The wetting agent is to lower the surface energy of the anti-glare coating composition, helping uniform application of the anti-glare coating composition on the transparent substrate layer.

The antifoaming agent is added to eliminate bubbles in the anti-glare coating composition. The silica is used as inorganic particles to increase the anti-scratch properties and the strength of the coating layer. Using silica having a volume average particle diameter of 1 to 50 nm secures forming a transparent coating layer and desirably does not affect the optical properties of the coating layer.

In accordance with another exemplary embodiment of the present invention, there is provided an anti-glare film prepared by using the anti-glare coating composition according to the above-described embodiment. The anti-glare film according to the embodiment comprises a transparent substrate layer; and an anti-glare layer overlying the transparent substrate layer and being formed from the anti-glare coating composition according to the above-described embodiment.

In this regard, the method of applying the anti-glare coating composition on the transparent substrate layer to form an anti-glare layer is not specifically limited. But, the application may be performed by wet coating, such as roll coating, bar coating, spray coating, dip coating, or spin coating. The composition of the anti-glare layer thus obtained is as described in regards to the anti-glare coating composition.

The transparent substrate material for the transparent substrate layer is not specifically limited in its composition and may include those commonly used in the technical field related to the preparation of anti-glare films. Specific examples of the transparent substrate material may include, but are not limited to, at least one selected from the group consisting of triacetylcellulose (TAC), polyethyleneterephthalate (PET), polyethylenenaphthalate (PEN), polycarbonate (PC), and norbornene-based polymers. Preferably, the transparent substrate material is triacetylcellulose (TAC) in the case that the anti-glare film is applied to a polarizing plate for high-definition display. The transparent substrate layer preferably has a light transmission of at least 85%. Further, the transparent substrate layer may have a haze value of 1% or less and a thickness of 30 to 120 m. But the haze value and the thickness are not given to limit the present invention.

The anti-glare film includes the olefin oxide compound represented by the formula 1 or 2 as contained in the anti-glare layer, so it has good anti-fingerprint properties as well as good properties required for anti-glare films, such as in terms of light transmission, haze value, reflection gloss, image definition, and contrast ratio.

More specifically, the anti-glare film according to the embodiment has a light transmission of at least 90% as measured as the basis of JIS-K-7105, a haze value of at least 1.0, a 60° reflection gloss of 70 to 90, an image definition of at least 250%, and a contrast ratio of at least 400 as measured on the basis of KS C IEC 61988-2-1.

Beside the above-mentioned properties, the anti-glare film also secures good anti-fingerprint properties. As will be described in "the detailed description of the present invention", the difference in haze value before and after application of a fingerprint is 1.5 or less, even no more than 1.0, which means a good quality in terms of fingerprint visibility. For evaluation of the anti-fingerprint properties, a human fingerprint mark is put on an anti-glare film and then rubbed with another finger to count the frequency of the finger's to-and-fro motions rubbing the fingerprint mark until no mark is visible. As a result, the fingerprint mark on a general anti-glare film not containing the olefin oxide compound of the formula 1 or 2 remains visible even after 10 times of the finger's to-and-fro motions, while the fingerprint mark on the anti-glare film according to the embodiment of the present invention becomes invisible with 5 times or less, even no more than 3 times of the finger's to-and-fro motions.

The experimental results show that the anti-glare film including an anti-glare layer coated with a composition comprising the olefin oxide compound of the formula 1 or 2 according to the embodiment of the present invention has good anti-fingerprint properties, including fingerprint visibility and fingerprint removing property.

On the other hand, the anti-glare film according to the embodiment may further include a low-reflection layer overlying the anti-glare layer and/or underlying the transparent substrate layer. In this regard, the low-reflection layer may have a thickness of 40 to 200 nm and a refraction index of 1.2 to 1.45. A low-reflection material for forming the low-reflection layer may include metal fluorides having a refraction index of 1.40 or less, such as NaF, LiF, $AlF_3$, $Na_5AlF_6$, $MgF_2$, or $YF_3$, which can be used alone or in mixture of at least two. Preferably, the low-reflection material has a particle diameter of 1 to 100 nm.

The low-reflection layer may further include fluoro-based silanes. Specific examples of the fluoro-based silanes may include, but are not limited to, tridecafluorooctyltriethoxysilane, heptadecafluorodecyltrimethoxysilane, or heptadecafluorodecyltriisopropoxysilane. These fluoro-based silanes may be used alone or in mixture of at least two.

In accordance with another embodiment of the present invention, the anti-glare film may further include an anti-stain layer underlying the transparent substrate layer and/or overlying the anti-glare layer. The thickness of the anti-stain layer may greater than 0 and 100 nm or less. The anti-stain layer may be formed from, if not specifically limited to, a monofunctional or multifunctional acrylate containing fluoro groups.

In accordance with still another embodiment of the present invention, there is provided a display device comprising the above-specified anti-glare film. Such a display device may be a high-definition flat display, more specifically, including LCD, PDP, OLED, or rear-projection TV.

Advantageous Effect of the Invention

As described above, the present invention makes it possible to prepare an anti-glare film having good anti-fingerprint properties as well as good properties required to the anti-glare films, such as, in terms of light transmission, haze value, reflection gloss, image definition, and contrast ratio, and thus can be usefully applied to the industrial field related to the preparation of anti-glare films for any kind of display device.

Details for Practicing the Invention

Hereinafter, a detailed description will be given as to the functions and effects of the present invention by way of examples, which are given merely to illustrate the present invention and not intended to limit the scope of the present invention.

The anti-glare films according to Examples and Comparative Example were prepared in the manner as described below in order to evaluate the anti-glare films formed from the anti-glare coating composition including a polyolefin oxide compound of the formula 1 or 2 in regards to the properties including anti-fingerprint properties.

EXAMPLE 1

Preparation 1 of Anti-Glare Film from Coating Composition Including Polyolefin Oxide Compound 10 g of urethane oligomer (manufactured by SK CYTEC), 20 g of a multifunctional monomer (compound name: dipentaerythritol hexa acrylate (DPHA)), 30 g of methylethylketone and 30 g of isopropyl alcohol as solvents, a photoinitiator (Igacure 184, Ciba) and an additive (Tego Glide 450) were uniformly mixed together to prepare a hard coating composition. To the hard coating composition were added 1 g of acryl-styrene copolymer resin (manufactured by Sekisui Plastic) as organic particles having a volume average particle diameter of 5 μm and a refraction index of 1.525 and then 10 g of an olefin oxide compound of the following formula 1-1. The mixture was stirred at the room temperature for 30 minutes or longer to prepare an anti-glare coating composition.

The anti-glare coating composition was applied to a thickness of 4.5 μm on an 80μm-thick triacetylcellulose-based transparent substrate by way of bar coating and then cured under exposure to UV radiation of 280 mJ/cm² to complete an anti-glare film.

$$EO_5\text{—}PO_{68}\text{-}EO_5 \qquad \text{[Formula 1-1]}$$

In the formula 1-1, EO is ethylene oxide; and PO is propylene oxide.

EXAMPLE 2

Preparation 2 of Anti-Glare Film from Coating Composition Including Polyolefin Oxide Compound The procedures were performed in the same manner as described in Example 1 to prepare an anti-glare film, excepting that 10 g of a compound of the following formula 1-2 was used in place of 10 g of the compound of the formula 1-1.

$$EO_7\text{-}PO_{54}\text{-}EO_7 \qquad \text{[Formula 1-2]}$$

In the formula 1-2, EO is ethylene oxide; and PO is propylene oxide.

EXAMPLE 3

Preparation 3 of Anti-Glare Film from Coating Composition Including Polyolefin Oxide Compound The procedures were performed in the same manner as described in Example 1 to prepare an anti-glare film, excepting that 10 g of a compound of the following formula 2-1 was used in place of 10 g of the compound of the formula 1-1.

$$CH_2\!=\!C(CH_3)COO\text{—}(CH_2CH_2O)_3\text{—}COO(CH_3)\!=\!CH_2 \qquad \text{[Formula 2-1]}$$

EXAMPLE 4

Preparation 4 of Anti-Glare Film from Coating Composition Including Polyolefin Oxide Compound The procedures were performed in the same manner as described in Example 1 to prepare an anti-glare film, excepting that 10 g of a compound of the following formula 2-2 was used in place of 10 g of the compound of the formula 1-1.

$$CH_2\!=\!CHCOO\text{—}(CH_2CH_3CHO)_3\text{—}COOH\!=\!CH_2 \qquad \text{[Formula 2-2]}$$

COMPARATIVE EXAMPLE 1

Preparation of Anti-Glare Film

The procedures were performed in the same manner as described in Example 1 to prepare an anti-glare film, excepting that 10 g of the compound of the formula 1-1 was not added to the coating composition.

EXPERIMENTAL EXAMPLE 1

Evaluation of Properties of Anti-Glare Films

1) Light Transmission/Haze Value
HM-150 (manufactured by Murakami Color Research Laboratory) was used to measure the light transmission and the haze value on the basis of JIS-K-7105.

2) 60° Reflection Gloss
Micro-TRI-gloss (manufactured by BYK Gardner) was used to measure the 60° reflection gloss.

3) Image Definition

ICM-1T (manufactured by Suga Test Instrument Co., Ltd.) was used to measure the image definition.

4) Contrast Ratio

The contrast ratio was determined according to the Korean Industrial Standards KS C IEC 61988-2-1.

5) Fingerprint Visibility

The change of the haze value before and after applying three person's fingerprint marks on the surface of each film (i.e., pushing down the film with an index finger with a constant pressure for 10 seconds) was averaged. The haze value was measured with HR-100 (manufactured by Murakami, Japan).

6) Fingerprint Removing Property

A human fingerprint mark was put on the anti-glare film with a black tape attached to the back side (in the same manner as described in the evaluation test of fingerprint visibility) and then rubbed with another finger, to count the frequency of the finger's to-and-fro motions rubbing the fingerprint mark until no mark was visible.

The results of Experimental Examples 1 to 6 are presented in Table 1.

TABLE 1

|  | Example 1 | Example 2 | Example 3 | Example 4 | Comparative Example 1 |
|---|---|---|---|---|---|
| Light transmission (%) | 93.5 | 93.4 | 93.4 | 93.4 | 93.5 |
| Haze | 3.0 | 3.1 | 2.9 | 3.0 | 3.0 |
| Gloss | 75 | 76 | 74 | 77 | 76 |
| Image definition | 380 | 375 | 382 | 376 | 380 |
| Fingerprint visibility (ΔHaze, %) | 1.0 | 1.2 | 1.2 | 1.3 | 2.0 |
| Fingerprint removing property (frequency) | 3 | 4 | 5 | 5 | >10 |
| Contrast ratio | 450 | 432 | 438 | 452 | 430 |

As can be seen from Table 1, the anti-glare films prepared from a coating composition including the compound having the olefin oxide repeating units was excellent in terms of fingerprint visibility and fingerprint removing property while having good basic properties such as light transmission, haze value, gloss, image definition, or contrast ratio, which were equivalent or above in comparison to those of the conventional anti-glare films.

More specifically, regarding the fingerprint visibility which was represented by the difference of haze value before and after application of fingerprint marks, the anti-glare films coated with the composition including the olefin oxide repeating units according to Examples 1 to 4 had low fingerprint visibility, causing only a little difference of the haze value before and after application of fingerprint marks. In other words, these films proved to be highly resistant to stains such as fingerprint marks.

In addition, when it comes to the fingerprint removing property representing the effect of removing fingerprints, the anti-glare films according to Examples required the far lower rubbing frequency and thus proved to be superior to the film of Comparative Example.

What is claimed is:

1. An anti-glare composition comprising organic or inorganic particles, a photocurable resin, a photoinitiator, and an olefin oxide compound represented by the following formula 1 or 2:

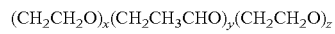  [Formula 1]

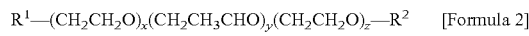  [Formula 2]

wherein each of $R^1$ and $R^2$ is independently (meth)acrylate, alkyl(meth)acrylate having 1 to 3 carbon atoms, hydroxide, or hydrogen;

wherein each of x and z is independently an integer from 0 to 150; and y is an integer from 20 to 100.

2. The anti-glare composition as claimed in claim 1, wherein each of x and z in the formula is independently an integer from 1 to 20.

3. The anti-glare composition as claimed in claim 1, wherein the organic or inorganic particles have a particle diameter of 1 to 10 μm.

4. The anti-glare composition as claimed in claim 1, wherein the organic or inorganic particles have a volume average particle diameter of 2 to 10 μm.

5. The anti-glare composition as claimed in claim 1, wherein the organic or inorganic particles include at least one selected from an organic particle group consisting of acryl-based resin, styrene-based resin, epoxy resin, and nylon resin; and an inorganic particle group consisting of silicon oxide, titanium dioxide, indium oxide, tin oxide, zirconium oxide, and zinc oxide.

6. The anti-glare composition as claimed in claim 1, wherein the photocurable resin has the difference of refraction index from the organic or inorganic particles in the range of 0.005 to 0.1.

7. The anti-glare composition as claimed in claim 1, wherein the photocurable resin includes at least one selected from a reactive acrylate oligomer group consisting of urethane acrylate oligomer, epoxy acrylate oligomer, polyester acrylate, and polyether acrylate; and a multifunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycero triacrylate, tripropylene glycol diacrylate, and ethylene glycol diacrylate.

8. The anti-glare composition as claimed in claim 1, wherein the olefin oxide compound represented by the formula 1 or 2 is contained at an amount of 1 to 50 parts by weight with respect to 100 parts by weight of the photocurable resin.

9. The anti-glare composition as claimed in claim 1, wherein the photoinitiator includes at least one selected from the group consisting of 1-hydroxy cyclohexylphenyl ketone, benzyl dimethyl ketal, hydroxydimethyl acetophenone, benzoin, benzoin methyl ether, benzoin ethyl ether, benzoin isopropyl ether, and benzoin butyl ether.

10. An anti-glare film comprising:
a transparent substrate layer; and
an anti-glare layer overlying the transparent substrate layer and being formed from the coating composition as claimed in claim 1.

11. The anti-glare film as claimed in claim 10, wherein the anti-glare film has a light transmission of at least 90% as measured on the basis of JIS-K-7105, a haze value of at least 1.0, a 60° reflection gloss of 70 to 90, an image definition of at least 250%, and a contrast ratio of at least 400 as measured on the basis of KS C IEC 61988-2-1.

12. A display device comprising the anti-glare film as claimed in claim 10.

* * * * *